US011129012B2

(12) United States Patent
Kim

(10) Patent No.: US 11,129,012 B2
(45) Date of Patent: Sep. 21, 2021

(54) APPARATUS AND METHOD FOR DETERMINING TIMER VALUE FOR CHANGING MODE IN WIRELESS COMMUNICATION SYSTEM

(71) Applicant: Samsung Electronics Co., Ltd., Suwon-si (KR)

(72) Inventor: Sangwon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/605,662

(22) PCT Filed: Apr. 24, 2018

(86) PCT No.: PCT/KR2018/004735
§ 371 (c)(1),
(2) Date: Oct. 16, 2019

(87) PCT Pub. No.: WO2018/199590
PCT Pub. Date: Nov. 1, 2018

(65) Prior Publication Data
US 2020/0120478 A1   Apr. 16, 2020

(30) Foreign Application Priority Data
Apr. 25, 2017   (KR) .......................... 10-2017-0052882

(51) Int. Cl.
*H04W 76/36*   (2018.01)
*H04W 8/08*   (2009.01)
(Continued)

(52) U.S. Cl.
CPC ............. *H04W 8/08* (2013.01); *H04W 8/245* (2013.01); *H04W 52/0216* (2013.01);
(Continued)

(58) Field of Classification Search
CPC .................................................... H04W 8/245
See application file for complete search history.

(56) References Cited

U.S. PATENT DOCUMENTS 9,730,156 B1 *   8/2017   Chamarty ............... H04L 67/16
2011/0273978 A1   11/2011   Murayama et al.
(Continued)

FOREIGN PATENT DOCUMENTS

WO   2016/148752 A1   9/2016
WO   2017/043767 A1   3/2017

OTHER PUBLICATIONS

Nokia, "Detailed description of the issues listed in S2-170698", S2-171840, SA WG2 Meeting #120, Mar. 21, 2017.
(Continued)

*Primary Examiner* — Fahmida S Chowdhury
(74) *Attorney, Agent, or Firm* — Jefferson IP Law, LLP

(57) ABSTRACT

The disclosure relates to technology for a sensor network, machine to machine communication (M2M), machine type communication (MTC), and the Internet of things (IoT). The disclosure may be used for an intelligent service (a smart home, a smart building, a smart city, a smart car or connected car, health care, digital education, retail business, security and safety-related service, etc.) on the basis of the technology. A mobility management entity (MME) apparatus in a wireless communication system includes a transmission/reception unit and a control unit functionally connected to the transmission/reception unit, wherein the control unit is configured to: determine a timer value used to allow a terminal supporting a power saving mode (PSM) to perform transition from a PSM state to an idle mode state; and control the transmission/reception unit so as to transmit, to the terminal, a message including information related to the determined timer value, and the timer value is determined on the basis of one of a mobile terminated (MT) data (Continued)

occurrence expectation time point and a mobile terminated data reception target value, pre-configured in the MME.

16 Claims, 9 Drawing Sheets

(51) Int. Cl.
  *H04W 76/38* (2018.01)
  *H04W 8/24* (2009.01)
  *H04W 52/02* (2009.01)
(52) U.S. Cl.
  CPC ....... *H04W 52/0248* (2013.01); *H04W 76/36* (2018.02); *H04W 76/38* (2018.02)

(56) References Cited

U.S. PATENT DOCUMENTS

| | | | |
|---|---|---|---|
| 2015/0043403 A1* | 2/2015 | Martinez Tarradell | ..................... H04W 72/082 370/311 |
| 2015/0327170 A1 | 11/2015 | Kim et al. | |
| 2016/0100362 A1* | 4/2016 | Palanisamy | ....... H04W 52/0229 370/311 |
| 2017/0339639 A1* | 11/2017 | Stojanovski | ...... H04W 52/0229 |
| 2018/0242388 A1 | 8/2018 | Park et al. | |
| 2018/0270188 A1* | 9/2018 | Kodaypak | ............... H04W 4/14 |
| 2019/0116483 A1* | 4/2019 | Ryu | ..................... H04W 76/32 |

OTHER PUBLICATIONS

Korean Office Action dated Feb. 22, 2021, issued in Korean Application No. 10-2017-0052882.

\* cited by examiner

APPARATUS AND METHOD FOR DETERMINING TIMER VALUE FOR CHANGING MODE IN WIRELESS COMMUNICATION SYSTEM

TECHNICAL FIELD

The disclosure relates to a wireless communication system and, more particularly, to an apparatus and a method for determining a timer value for changing a mode.

BACKGROUND ART

The Internet is evolving from a human-oriented connection network in which humans generate and consume information, to the internet of things (IoT) network in which distributed elements, such as objects and the like, exchange and process information. An internet of everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted.

In an IoT environment, through collection and analysis of data generated in connected objects, an intelligent internet technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional information technology (IT) and various industries.

In the IoT environment, an IoT terminal should operate using a limited battery for a long time, 3rd generation partnership project (3GPP) introduced a power saving mode (PSM) in release-12 in order to save battery power of the terminal. The PSM is a mode for further improving power consumption in the conventional radio resource control (RRC) idle mode. The IoT terminal transitioning from the idle mode state to the PSM state does not receive mobile terminated data. A mobility management entity (MME) of a network, which the IoT terminal accesses, allocates a timer value to allow the IoT terminal to transition again to the idle mode state from the PSM state. When the timer value expires, the IoT terminal may transition to the idle mode state and receive mobile terminated data.

DISCLOSURE OF THE INVENTION

Technical Problem

Based on the above discussion, the disclosure provides an apparatus and a method for allocating a timer value used when a terminal supporting a power saving mode (PSM) in a wireless communication system transitions from a PSM state to an idle mode state.

The disclosure provides an apparatus and a method for allocating a timer value used when a terminal transitions from a PSM state to an idle mode state on the basis of a target number of receptions of mobile terminated data preset in a mobility management entity (MME) in a wireless communication system.

The disclosure provides an apparatus and a method for allocating a timer value used when a terminal transitions from a PSM state to an idle mode state on the basis of an expected time point at which mobile terminated data is generated to an MME in a wireless communication system.

Solution to Problem

In accordance with an aspect of the disclosure, a method of operating a mobility management entity (MME) in a wireless communication system is provided. The method includes: determining a timer value used when a terminal supporting a power saving mode (PSM) transitions from a PSM state to an idle mode state; and transmitting a message including information on the determined timer value to the terminal, wherein the timer value is determined based on one of an expected time point at which mobile terminated (MT) data to the terminal is generated and a target number of receptions of mobile terminated data preset in the MME.

In accordance with another aspect of the disclosure, an apparatus of a mobility management entity (MME) in a wireless communication system is provided. The apparatus includes: a transceiver; and at least one processor functionally connected to the transceiver, wherein the at least one processor is configured to determine a timer value used when a terminal supporting a power saving mode (PSM) transitions from a PSM state to an idle mode state and control the transceiver to transmit a message including information on the determined timer value to the terminal, and the timer value is determined based on one of an expected time point at which mobile terminated (MT) data to the terminal is generated and a target number of receptions of mobile terminated data preset in the MME.

In accordance with another aspect of the disclosure, an apparatus of a terminal supporting a power saving mode (PSM) in a wireless communication system is provided. The apparatus includes: a transceiver; and at least one processor functionally connected to the transceiver, wherein the at least one processor is configured to control the transceiver to receive information on a timer value used when the terminal transitions from a PSM state to an idle mode state from a mobility management entity (MME) and transition from the PSM state to the idle mode state, based on the timer value, and the timer value is determined based on one of an expected time point at which mobile terminated (MT) data to the terminal is generated and a target number of receptions of mobile terminated data preset in the MME.

In accordance with another aspect of the disclosure, a method of operating a terminal supporting a power saving mode (PSM) in a wireless communication system is provided. The method includes: receiving information on a timer value used when the terminal transitions from a PSM state to an idle mode state from a mobility management entity (MME); and transitioning from the PSM state to the idle mode state, based on the timer value, wherein the timer value is determined based on one of an expected time point at which mobile terminated (MT) data to the terminal is generated and a target number of receptions of mobile terminated data preset in the MME.

Advantageous Effects of Invention

According to an apparatus and a method according to various embodiments of the disclosure, it is possible to improve a mobile terminated data reception success rate of a terminal by determining a timer value for transitioning the terminal from a power saving mode (PSM) state to an idle mode state on the basis of a target number of receptions of mobile terminated data preset in a mobility management entity (MME) and an expected time point at which mobile terminated data is generated.

According to an apparatus and a method according to various embodiments of the disclosure, it is possible to reduce buffering burden of a gateway (GW) by determining a timer value for transitioning the terminal from a power saving mode (PSM) state to an idle mode state on the basis of a target number of receptions of mobile terminated data preset in a mobility management entity (MME) and an expected time point at which mobile terminated data is generated.

According to an apparatus and a method according to various embodiments of the disclosure, it is possible to reduce retransmission signaling of mobile terminated data transmitted from an application server (AS) by determining a timer value for transitioning the terminal from a power saving mode (PSM) state to an idle mode state on the basis of a target number of receptions of mobile terminated data preset in a mobility management entity (MME) and an expected time point at which mobile terminated data is generated.

Effects which may be acquired by the disclosure are not limited to the above described effects, and other effects that have not been mentioned may be clearly understood by those skilled in the art from the following description.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure describes various embodiments for allocating a timer value to allow a terminal supporting a power saving mode (hereinafter, referred to as a PSM) to transition from a PSM state to an idle mode state in a wireless communication system.

In the following description, the term referring to a specific entity or node (for example, a terminal or a mobility management entity (hereinafter, referred to as an MME)), the term referring to a mode state (for example, a connected mode, an idle mode, or a PSM), the term referring to a specific timer (for example, a T3324 timer or a T3412 timer), and the term referring to an element of a device are mentioned for convenience of description. Accordingly, the disclosure is not limited to the following terms and other terms having the same technical meaning may be used.

Figure 1:
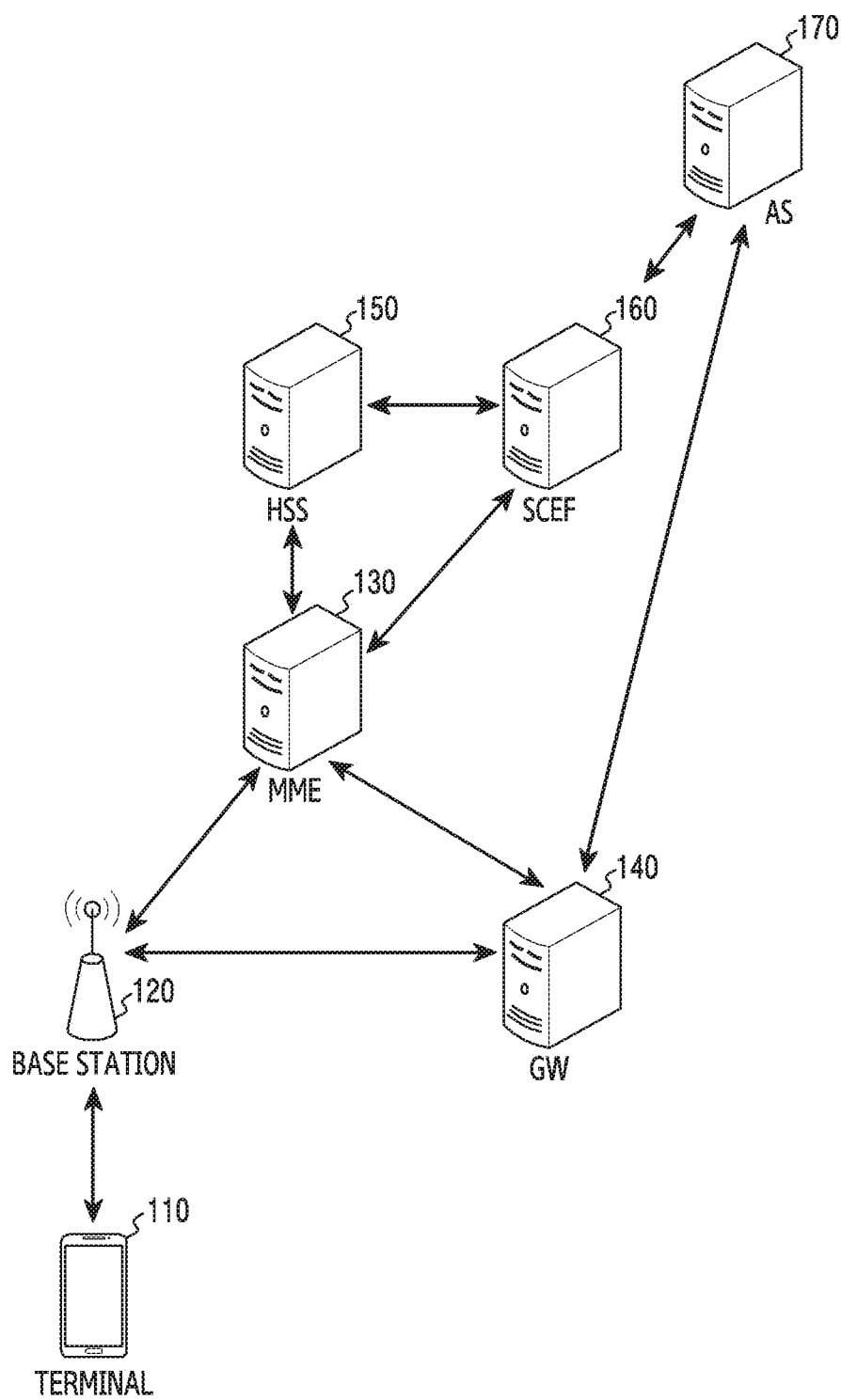
FIG. 1 illustrates a structure of a wireless communication system according to various embodiments of the disclosure.

FIG. 1 illustrates a structure of a wireless communication system according to various embodiments of the disclosure.

Referring to FIG. 1, a wireless communication system includes a terminal 110, a base station 120, an MME 130, a gateway (GW) 140, a home subscriber server (HSS) 150, a service capability exposure function (SCEF) 160, and an application server (AS) 170.

The wireless communication system may additionally include other elements according to an implementation method. Further, each of the entities included in the wireless communication system may be one entity or a set of a plurality of entities. For example, although FIG. 1 illustrates only one GW 140, the GW 140 may include a serving GW (S-GW) and a packet data network GW (P-GW).

The terminal 110 is a device used by a user and communicates with the base station 120 through a radio channel. According to circumstances, the terminal 110 may operate without involvement of the user. That is, terminal 110 is a device that performs machine type communication (MTC), and may not be carried by the user. The terminal 110 may be referred to as "user equipment (UE)", "mobile station", "subscriber station", "remote terminal", "wireless terminal", "user device", or other terms having the equivalent technical meaning, in addition to "terminal".

The base station 120 is a network infrastructure element that provides radio access to the terminal 110. The base station 120 has coverage defined as a predetermined geographical region based on the distance at which a signal may be transmitted. The base station 120 may be referred to as "access point (AP)", an "evolved NodeB (eNB)", a "5th-generation (5G) node", a "wireless point", a "transmission/reception point (TRP)", or another term having a technical meaning equivalent thereto, as well as "base station".

The MME 130 performs various control functions related to mobility of the terminal 110. For example, the MME 130 may control a procedure related to configuration or release of a bearer between the terminal 110 and the GW 140. In another example, the MME 130 may allocate a timer value used when the terminal 110 transitions to an operation mode (for example, a connected mode, an idle mode, or a PSM mode).

The GW 140 generates a bearer for transmitting and receiving data with the terminal 110 under the control of the MME 130. Further, the GW 140 allocates an IP address to the terminal 110 and serves as an anchor. The HSS 150 stores key information for authenticating the terminal 110 and a subscriber profile. The SCEF 160 is an entity for safely exposing the network to an external server such as the AS 170. The SCEF 160 receives a message from the AS 170 and communicates with the HSS 150 in order to manage a plurality of terminal groups including the terminal 110. The AS 170 is an external server of the network which the terminal 110 accesses. The AS 170 may be referred to as a machine-type communication (MTC) server or a machine-to-machine (M2M) server. The AS 170 may transmit an expected time point at which mobile terminated (MT) data to be transmitted to the terminal 110 is generated to the MME 130 via the SCEF 160 and the HSS 150. The AS 170 may transmit the mobile terminated data to the terminal 110 via the SCEF 160 and the MME 130 (for example, in the case of low volume data or non-IP data), transmit the mobile terminated data to the terminal 110 via the GW 140, the MME 130, and the base station 120, or transmit the mobile terminated data to the terminal 110 via the GW 140 and the base station 120 (in the case of high volume data or IP data).

Figure 2:
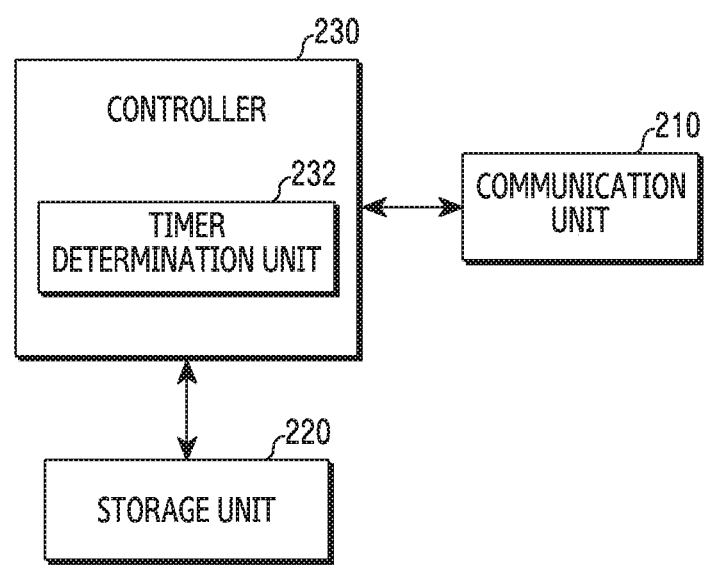
FIG. 2 is a block diagram illustrating network entities in a wireless communication system according to various embodiments of the disclosure.

FIG. 2 illustrates a configuration of network entities in a wireless communication system according to various embodiments of the disclosure. The term "~unit" or "~er" used hereinafter may refer to the unit for processing at least one function or operation and may be implemented in hardware, software, or a combination of hardware and software.

Referring to FIG. 2, the network entities include a communication unit 210, a storage unit 220, and a controller 230. The configuration illustrated in FIG. 2 may be the configuration of the MME 130, the GW 140, the HSS 150, the SCEF 160, or the AS 170. The communication unit 210 provides an interface for communicating with other nodes within the network. The communication unit 210 converts a bitstream transmitted to another entity into a physical signal and converts a physical signal received from another entity into a bitstream. Further, the communication unit 210 may transmit and receive a signal. Accordingly, the communication unit 210 may be referred to as a "transmitter", a "receiver", or a "transceiver".

The storage unit 220 stores data such as a basic program, an application, and configuration information for the operation of the network entities. The storage unit 220 may be configured as volatile memory, non-volatile memory, or a combination of volatile memory and non-volatile memory. The storage unit 220 provides stored data according to a request from the controller 230.

The controller 230 may include at least one processor or may be a part of the processor, and controls the overall operation of the network entities. For example, the controller 230 transmits and receives a signal through the communication unit 210. The controller 230 records data in the storage unit 220 or reads data stored in the storage unit 220. According to various embodiments, the controller 230 may allocate a timer value for operation mode transition of the terminal (for example, the terminal 110) and transmit the allocated timer value, so as to increase a mobile terminated data reception success rate of the terminal. For example, a timer determination unit 232 included in the controller 230 may determine a timer value used for transitioning the terminal 110 from a PSM state to an idle mode state. The timer value may be determined on the basis of one of an expected time point at which mobile terminated data is generated or a preset target number of receptions of mobile terminated data. The controller 230 may control the communication unit 210 to transmit a message including information on the determined timer value.

The controller 230 may control the communication unit 210 to receive a tracking area update (TAU) request message from the terminal 110. The controller 230 may control the communication unit 210 to receive an attach request message or a routing area update (RAU) request message instead of the TAU request message according to an implementation method.

The timer determination unit 232 may identify an average number of transmissions of mobile terminated data transmitted to the terminal 110 while the terminal 110 is in the PSM state and determine the timer value on the basis of the identified average number of transmissions of mobile terminated data and the preset target number of receptions of mobile terminated data. The relationship between the average number of transmissions of mobile terminated data, the target number of receptions of mobile terminated data, and the timer value is determined on the basis of a cumulative distribution function of gamma distribution of the average number of transmissions of mobile terminated data and the target number of receptions of mobile terminated data.

The controller 230 may identify a time point at which the terminal 110 transitions to the idle mode state on the basis of a resource release request message (for example, an e-radio access bearer (RAB) release request) received from the base station 120 and control the communication unit 210 to receive information on the expected time point at which mobile terminated data is generated from the AS 170. The timer determination unit 232 may determine the timer value on the basis of the time point at which the terminal 110 transitions to the idle mode state and the expected time point at which mobile terminated data is generated.

Figure 3:
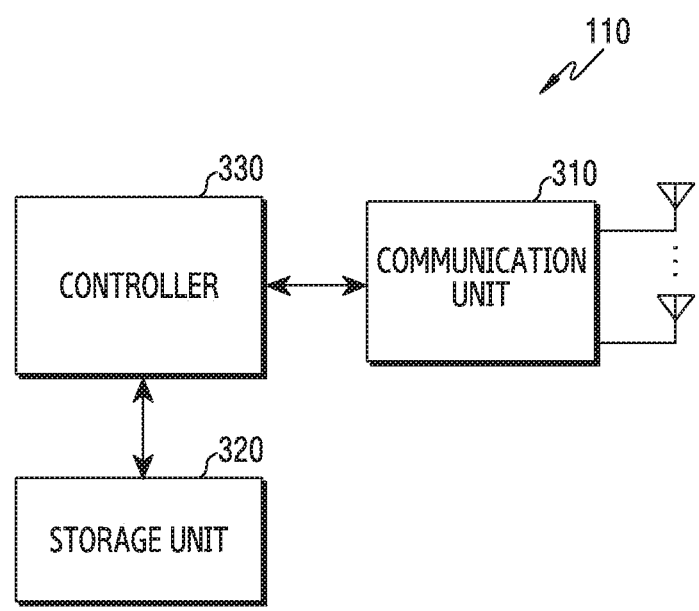
FIG. 3 illustrates a configuration of a terminal in a wireless communication system according to various embodiments of the disclosure.

FIG. 3 illustrates a configuration of the terminal in a wireless communication system according to various embodiments of the disclosure. The term "~unit" or "~er" used hereinafter may refer to the unit for processing at least one function or operation and may be implemented in hardware, software, or a combination of hardware and software.

Referring to FIG. 3, the terminal 120 includes a communication unit 310, a storage unit 320, and a controller 330. The configuration illustrated in FIG. 3 may be understood as the configuration of the terminal 110.

The communication unit 310 performs functions for transmitting/receiving a signal through a wireless channel According to an embodiment, the communication unit 310 performs a function of conversion between a baseband signal and a bitstream according to a physical layer standard of the system. According to another embodiment, the communication unit 310 up-converts a baseband signal into an RF band signal, transmits the RF band signal through an antenna, and down-converts the RF band signal received through the antenna into a baseband signal. The communication unit 310 may include at least one antenna array including a plurality of transmission/reception paths and a plurality of antenna elements. The communication unit 310 may be referred to as a "transmitter", a "receiver", or a "transceiver". In the following description, the transmission and reception operation performed by the communication unit 310 is used to include performance of the following processing.

The storage unit 320 stores data such as a basic program, an application program, and setting information for the operation of the terminal 110. The storage unit 320 may be configured as volatile memory, non-volatile memory, or a combination of volatile memory and non-volatile memory. The storage unit 320 provides stored data according to a request from the controller 330.

The controller 330 may include at least one processor or may be a part of the processor. The part of the communication unit 310 or the controller 330 may be referred to as a communication processor (CP). The controller 330 controls the overall operation of the terminal 110. For example, the controller 330 transmits and receives a signal through the communication unit 310. In another example, the controller 330 records data in the storage unit 320 or reads data stored in the storage unit 320. According to various embodiments, the controller 330 may increase a mobile terminated data reception success rate of the terminal by switching the operation mode of the terminal 110 on the basis of the timer value received from the MME 130.

More specifically, the controller 330 controls the communication unit 310 to receive, from the MME 130, information on a timer value used when the terminal 110 transitions from the PSM state to the idle mode state, and the terminal 110 transitions from the PSM state to the idle mode state on the basis of the timer value. The timer value is determined by the MME 130 on the basis of one of an expected time point at which mobile terminated data is generated and a target number of receptions of mobile terminated data preset in the MME 130. Further, the controller 330 controls the communication unit 310 to transmit a TAU request message, an attach request message, or an RAU request message to the MME 130.

In the IoT environment, MTC corresponding to communication between machines has been researched without involvement of human. In the case of an MTC device, there is no involvement of the person and mobile terminated data is not frequently received and thus is it required to keep a battery for a long time. In order to reflect such requirements, the MTC device may support the PSM. The terminal (that is, the MTC device) supporting the PSM may operate in three operation modes. The operations modes include a connected mode (for example, an RRC-connected, evolved packet service (EPS) mobility management (EMM)-registered, or EPS connection management (ECM)-connected), an idle mode (for example, RRC-idle, EMM-idle, or ECM-idle), and a PSM.

The terminal in the connected mode state may have a logical connection with the base station. For example, in the case of RRC-connected, the terminal maintains a RRC-connected state with the base station. In this case, the base station may identify the location of the terminal in units of cells. the terminal in the idle mode state is managed in units of tracking areas (TAs) which are the unit larger than cells. When the terminal in the idle mode state needs uplink data transmission or receives a paging signal from the base station, the terminal may transition from the idle mode state to the connected-mode state. The terminal transitioning from the idle mode state to the PSM state stops all procedures of the idle mode and deactivates a function of an access stratum. Accordingly, the terminal in the PSM state does not receive a paging signal and cannot receive mobile terminated data. When the terminal in the PSM state needs transmission of mobile originated data or a preset timer expires, the terminal in the PSM state may transition to the idle mode. Hereinafter, FIG. 4 describes an example in which the terminal operation mode transitions on the basis of the timer.

Figure 4:
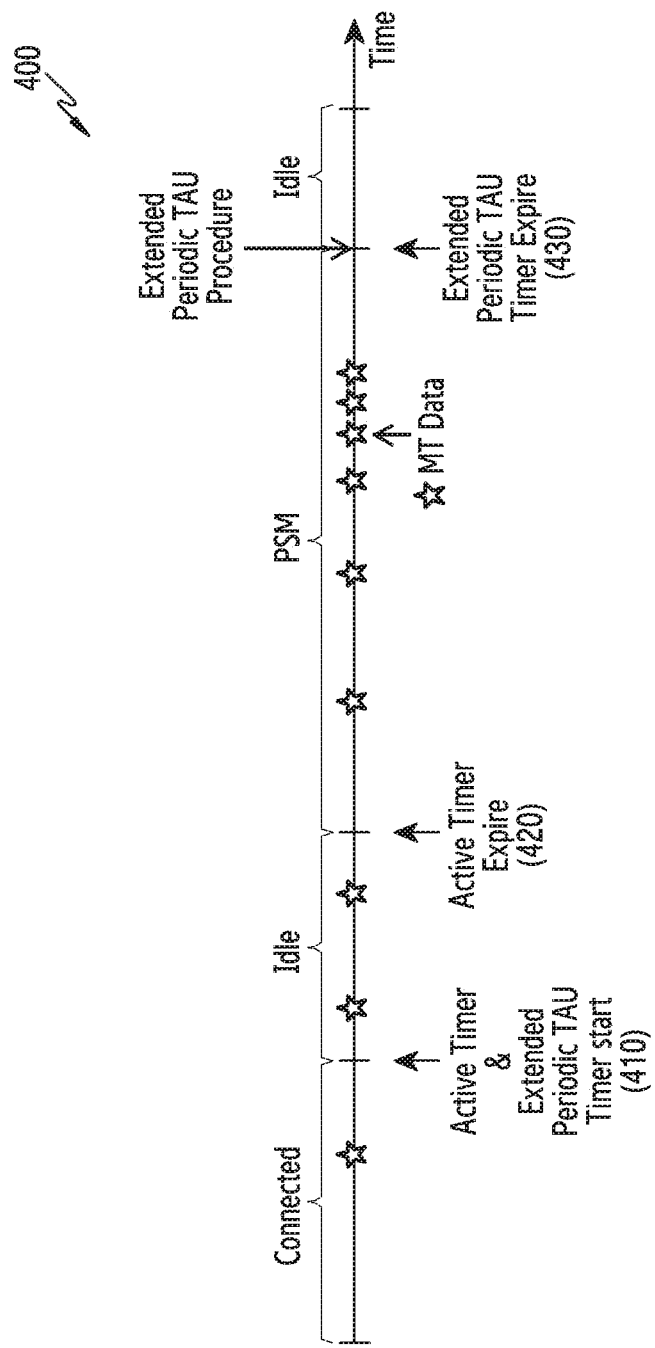
FIG. 4 illustrates an example of an operation in which a mode state of the terminal supporting a power saving mode (PSM) transitions on the basis of a timer value in a wireless communication system according to various embodiments of the disclosure.

FIG. 4 illustrates an example of the operation in which a mode state of a terminal supporting a PSM transitions on the basis of a timer value in a wireless communication system according to various embodiments of the disclosure. FIG. 4 may be understood as illustrating the operation in which the mode state of the terminal 110 transitions.

Referring to FIG. 4, a graph 400 illustrates a process in which the operation mode of the terminal 110 transitions according to the time. For example, the unit of time may be hour. It is assumed that the terminal 110 is first in the connected-mode state. In a time point 410, the terminal 110 transitions from the connected-mode state to the idle mode state and, at the same time, an active timer and an extended periodic TAU timer included in the terminal 110 start. In the disclosure, the active timer is a timer used when the terminal supporting the PSM transitions from the idle mode state to the PSM state. The active timer may be referred to as T3324. In FIG. 4, a timer value of T3324 may be a difference between a time point 420 and the time point 410. In the disclosure, the extended periodic TAU timer is a timer used when the terminal supporting the PSM transitions from the PSM state to the idle mode state. The extended periodic TAU timer may be referred to as T3412. In FIG. 4, a timer value of T3412 may be a difference between a time point 430 and the time point 410. The terminal supporting the PSM needs to maintain the PSM state for a longer time for battery efficiency, and thus the extended periodic TAU timer value should be configured to be longer than the active timer value.

When the active timer expires at the time point 420, the terminal 110 transitions to the PSM state from the idle mode state. Mobile terminated data may be transmitted from the AS server 170 while the terminal 110 is in the PSM state, but the terminal 110 cannot receive the mobile terminated data since the function of the access stratum is deactivated.

When the extended periodic TAU timer expires at the time point 430, the terminal 110 transitions to the idle mode state from the PSM state and activates the function of the access stratum. The terminal 110 transitioning to the idle mode state performs an extended periodic TAU procedure in order to report the location of the terminal 110.

The terminal supporting the PSM transmits a request message to the MME 130 in order to receive a configuration of a timer value of the active timer or the extended period TAU timer. The request message may be a TAU request message, an RAU request message, or an attach request message. The MME 130 receiving the request message may configure a timer value of the active timer or the extended periodic TAU timer randomly for each subscriber (in other words, each terminal). The configured time value may be included in a response message which the MME 130 transmits to the terminal 110. The response message may be a TAU accept message, an attach accept message, or an RAU accept message. The MME 130 knows the value of the active timer and the extended periodic TAU timer allocated to the terminal 110 and thus recognizes that the terminal 110 is in the PSM state. Accordingly, when a signal indicating transmission of mobile terminated data from the GW 140 is received, the MME 130 makes a request for buffering the mobile terminated data to the GW 140. According to the procedure, the allocated active timer value and extended periodic TAU timer value do not reflect a service characteristic of each terminal (for example, PSM time, residual amount of battery, and average number of transmissions of mobile terminated data), which results in increasing buffering burden of the GW 140. Accordingly, packet drop of the mobile terminated data may occur in the GW 140 having a limited buffering capacity.

Hereinafter, a method of determining an extended TAU timer value on the basis of one of an expected time point at which mobile terminated data of the terminal supporting the PSM is generated or a target number of receptions of mobile terminated data preset in the MME. In the disclosure, the target number of receptions of mobile terminated data is a number of times the terminal receives mobile terminated data while the terminal is in the PSM state. In the disclosure, the expected time point at which the mobile terminated data is generated is a time point at which the mobile terminated data is transmitted to the terminal in the state in which the access stratum of the terminal is activated. In other words, the expected time point at which the mobile terminated data is generated is a time point at which the mobile terminated data is transmitted to the terminal in the state in which the terminal is capable of receiving the mobile terminated data.

Figure 5:
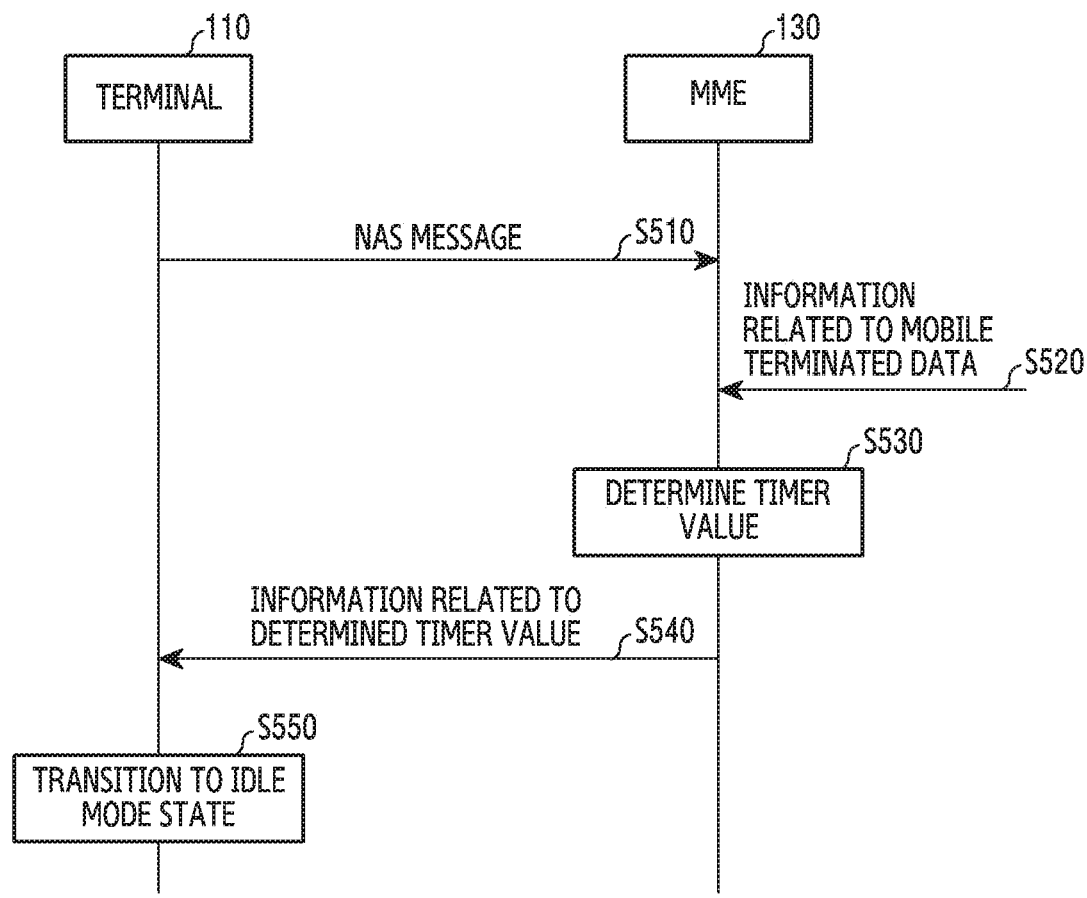
FIG. 5 illustrates signal flow for transmitting information on a timer value in a wireless communication system according to various embodiments of the disclosure.

FIG. 5 illustrates signal flow for transmitting information on a timer value in a wireless communication system according to various embodiments of the disclosure.

Referring to FIG. 5, in step S510, the terminal 110 transmits a non-access stratum (NAS) message. The NAS message is a message exchanged between the terminal 110 and the MME 1130 through a signaling protocol. The NAS message may be one of a TAU request message, an attach request message, or an RAU request message.

In step S520, the MME 130 receives information on mobile terminated data. The information on the mobile terminated data is information used for determining a timer value. For example, the information on the mobile terminated data includes information on an expected time point at which mobile terminated data is generated or a target number of receptions of mobile terminated data. The MME 130 may receive the information on the expected time point at which mobile terminated data is generated or the target number of receptions of mobile terminated data according to various schemes. For example, the information on the time point at which the mobile terminated data is generated may be included in communication pattern information transmitted from the AS 170 via the SCEF 160 and the HSS 150. The target number of receptions of mobile terminated data may be preset in the MME 130 on the basis of a user input.

In step S530, the MME 130 determines a value of a timer T3412 (that is, an extended periodic TAU timer) on the basis of the information on the time point at which the expected time point at which the received mobile terminated data is generated or the target number of receptions of mobile terminated data. According to an embodiment, the operation in which the MME 130 determines the value of the timer T3412 on the basis of the target number of receptions of mobile terminated data is described below.

The MME 130 may determine the timer value using table information pre-stored in the storage unit 220. The table information shows values of the timer T3412 determined on the basis of a target number of receptions of mobile terminated data preset in the MME 130, a mobile terminated data reception success rate, an average number of transmissions of mobile terminated data while the terminal 110 is in the PSM state, and a value of the timer T3412 previously allocated to the terminal 110. For example, the table information may be as shown in [Table 1] below.

TABLE 1

| Success rate (%) | α | λ | Previously configured timer value (unit: hour) | Changed timer value (unit: hour) |
|---|---|---|---|---|
| 90 | 2 | 1/4 | 360 | 9.93 |
| 75 | 2 | 1/4 | 360 | 117.67 |
| 50 | 2 | 1/4 | 360 | 208.95 |
| 25 | 2 | 1/4 | 360 | 273.49 |
| 10 | 2 | 1/4 | 360 | 312.14 |
| 5 | 2 | 1/4 | 360 | 328.02 |

In [Table 1] above, a success rate denotes a probability that the terminal 110 successfully receives mobile terminated data, α denotes a target number of receptions of mobile terminated data, and λ denotes an average number of transmissions of mobile terminated data transmitted while the terminal 110 is in the PSM state. The previously configured timer value is the value of the timer T3412 previously allocated to the terminal 110. The changed timer value is the value of the timer T3412 which the MME 130 desires to allocate to the terminal 110. α and the success rate correspond to values preset in the MME 130, and λ is an average value of input values accumulated while the terminal 110 is in the PSM state.

For example, referring to [Table 1] above, when a target number of receptions of mobile terminated data preset in the MME 130 is 2, a success rate is 74%, an average number of transmissions of mobile terminated data transmitted while the terminal 110 is in the PSM state is 4, and a value of the timer T3412 previously allocated to the terminal 110 is 360 hours, the MME 130 may allocate a value of the timer T3412 of 117.67 hours to the terminal 110 on the basis of the table information. The relationship between parameters included in the table information is described below.

When it is assumed that mobile terminated data is transmitted n times while the terminal is in the PSM state, discrete probability distribution for the number of mobile terminated data transmitted for a unit time follows Poisson distribution. In order to control a timer value (that is, a value of the timer T3412) configured to reduce the number of non-receptions of mobile terminated data, distribution for a time required until an nth event occurs in the Poisson distribution may be indicated as an Erlang distribution. Since the Erlang distribution assumes only the case in which n is a positive integer, gamma distribution may be considered to expand the positive integer to a positive real number. A gamma distribution equation may be as shown in Equation (1).

$$f(x) = \begin{cases} \dfrac{1}{\beta^\alpha \Gamma(\alpha)} x^{\alpha-1} e^{-x/\beta} & \text{if } x > 0 \\ 0 & \text{otherwise} \end{cases} \quad \text{Equation (1)}$$

In Equation (1), α is a shape parameter associated with a shape of distribution and corresponds to a (target) number of receptions of mobile terminated data expected while the terminal is in the PSM state in the present embodiment. β is a scale parameter associated with a scale of distribution and corresponds to an average number of transmissions of mobile terminated data transmitted while the terminal is in the PSM state. The average number of transmissions of mobile terminated data may be expressed as λ. Both α and β are larger than 0. Γ(α) is a gamma function, and the gamma function equation may be as shown in Equation (2) below.

$$\Gamma(\alpha) = \int_0^\infty e^{-x} x^{\alpha-1} dx, \alpha > 0 \quad \text{Equation (2)}$$

In Equation (2) above, a is a value corresponding to n in the Erlang distribution and corresponds to a positive real number larger than 0.

A cumulative distribution function (C.D.F) of the gamma distribution equation expressed in Equation (1) may be as shown in Equation (3) below.

$$F(x) = \frac{\Gamma(n, x*\lambda)}{\Gamma(n)} \quad \text{Equation (3)}$$

$$F(x) = \sum_{k=0}^{n-1} e^{-\lambda x} \frac{(\lambda*k)^k}{k!}$$

In Equation (3) above, $\Gamma(n)$ is a gamma function for n, and n is a number of transmissions of mobile terminated data for a unit time. $\lambda$ is a reciprocal number of the average number of transmissions of mobile terminated data. F(x) is distribution of a time required until an nth event occurs in gamma distribution. An inverse function of the cumulative distribution function F(x) of gamma distribution to obtain distribution of a time required for occurrence of the nth event on the basis of a random variable F(x) which is a reception success rate of mobile terminated data desired by an operator is as shown in Equation (4) below.

$$f(x) = F^{-1}(x) \quad \text{Equation (4)}$$

The MME 130 may determine the value of the timer T3412 using a result value calculated by the function equation $f(x)$. More specifically, the MME 130 may determine a changed value of the timer T3412 by multiplying an increment/decrement of the timer value previously configured in the terminal 110 and the result value calculated on the basis of the function equation.

The relationship between the result value calculated by the function equation, the previously configured value of the timer T3412, and the changed value of the timer T3412 is as shown in [Table 2] below.

TABLE 2

| Success rate (%) | α | λ | Function equation | Result value | Previously configured timer value (unit: time) | Changed timer value (unit: time) |
|---|---|---|---|---|---|---|
| 90 | 2 | 1/4 | $1-f(0.90,\alpha,1/\lambda)$ | 0.0276 | 360 | 9.93 |
| 75 | 2 | 1/4 | $1-f(0.75,\alpha,1/\lambda)$ | 0.3268 | 360 | 117.67 |
| 50 | 2 | 1/4 | $1-f(0.50,\alpha,1/\lambda)$ | 0.5804 | 360 | 208.95 |
| 25 | 2 | 1/4 | $1-f(0.25,\alpha,1/\lambda)$ | 0.7597 | 360 | 273.49 |
| 10 | 2 | 1/4 | $1-f(0.10,\alpha,1/\lambda)$ | 0.8670 | 360 | 312.14 |
| 5 | 2 | 1/4 | $1-f(0.05,\alpha,1/\lambda)$ | 0.9112 | 360 | 328.02 |

In [Table 2] above, a success rate denotes a probability that the terminal 110 successfully receives mobile terminated data, α denotes a target number of receptions of mobile terminated data, and λ denotes an average number of transmissions of mobile terminated data transmitted while the terminal 110 is in the PSM state. The previously configured timer value is the value of the timer T3412 previously allocated to the terminal 110. The changed timer value is the value of the timer T3412 which the MME 130 desires to allocate to the terminal 110. The result value is a result value calculated when α, the success rate, and λ are input into the function equation $f(x)$ generated by Equation (4). αλ and the success rate correspond to values preset in the MME 130, and λ is an average value of input values accumulated while the terminal 110 is in the PSM state.

For example, referring to [Table 2], when a target number of receptions of mobile terminated data preset in the MME 130 is 2, a success rate is 75%, an average number of transmissions of mobile terminated data transmitted when the terminal 110 is in the PSM state is 4, and a value of the timer T3412 previously allocated to the terminal 110 is 360 hours, the MME 130 may calculate the result value 0.3268 by inputting α, the success rate, and λ into the function equation f(x). The MME 130 may determine the value of the timer T3412 of 117.67 (hours) to be allocated to the terminal 110 by multiplying the calculated result value and the previously configured timer value of 360 hours. In other words, when the terminal 110 previously configured the value of the timer T3412 as 360 hours, a value of the timer T3412 newly allocated by the MME 130 corresponds to 117.67 hours. In this case, a probability that a number of times data is not terminated is 2 while the terminal 110 is in the PSM state is 75%.

According to another embodiment, the operation in which the MME 130 determines the value of the timer T3412 on the basis of the expected time point at which mobile terminated data is generated is described below.

Although not illustrated in FIG. 5, the MME 130 may receive a resource release request message from the base station 120. For example, the resource release request message may be an E-RAN release request message. The MME 130 may determine a time point $w_n$ at which the terminal 110 enters the idle mode on the basis of the time point at which the received resource releaser request message is received. The time point $w_n$ may correspond to the time point 410 of FIG. 4. The MME 130 may determine the value of the timer T3412 on the basis of the expected time point at which the expected time point $\tau_{n+1}$ at which the mobile terminated data received in step S520 is generated and the time point $w_n$ at which the terminal 110 enters the idle mode. More specifically, in order to successfully receive mobile terminated data at the time point $\tau_{n+1}$ by the terminal 110, the terminal 110 should transition to the idle mode state from the PSM state before the time point $\tau_{n+1}$, so that the MME 130 may determine the value of the timer T3412 to be a value, obtained by subtracting the time point $w_n$ from the time point $\tau_{n+1}$ or to be smaller than the corresponding value. In other words, the MME 130 may indicate the value of the timer T3412 through Equation (5) below.

$$T3412 = \tau_{n+1} - w_n \quad \text{Equation (5)}$$

T3412 is a value of the timer T3412 which the MME 130 allocates to the terminal 110. $\tau_{n+1}$ is an expected time point at which mobile terminated data is generated. $w_n$ is a time point at which the terminal 110 transitions from the connected-mode state to the idle mode state.

Figure 6:
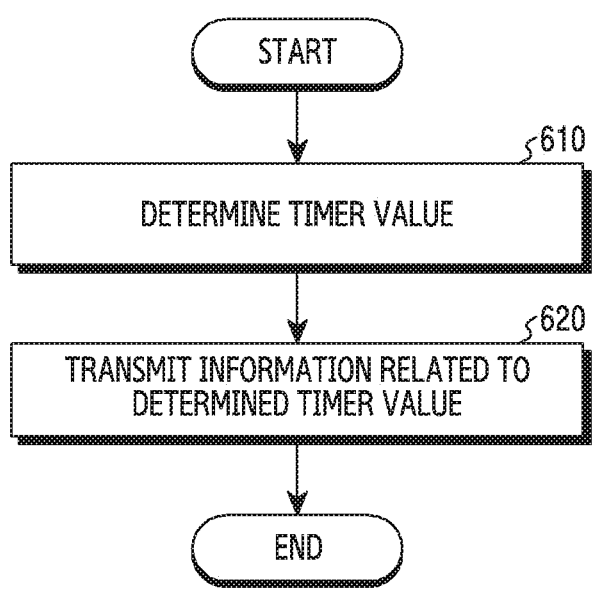
FIG. 6 illustrates operation flow of an MME for determining a timer value in a wireless communication system according to various embodiments of the disclosure.

FIG. 6 illustrates operation flow of an MME for determining a timer value in a wireless communication system according to various embodiments of the disclosure. The operation illustrated in FIG. 6 may be understood as the operation of the MME 130.

Referring to FIG. 6, in step 610, the MME 130 determines a timer (that is, the timer T3142) value used when the terminal 110 supporting the PSM transitions from the PSM state to the idle mode state. The timer value is determined on the basis of one of an expected time point at which mobile terminated data is generated and a target number of receptions of mobile terminated data preset in the MME.

In step 610, the MME 130 transmits a message including information on the determined timer value to the terminal.

The message including the information on the timer value may be a TAU accept message, an RAU accept message, or an attach accept message.

Figure 7:
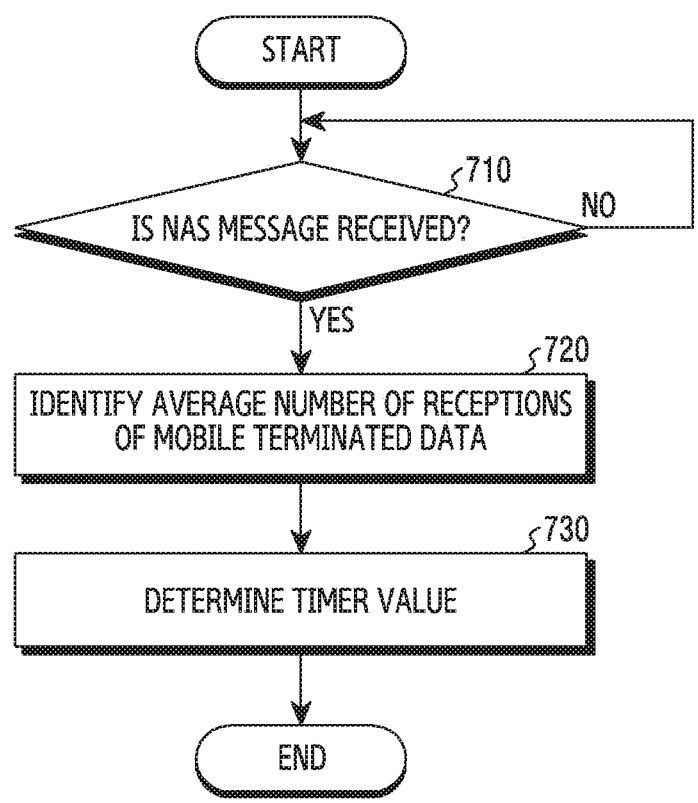
FIG. 7 illustrates operation flow of an MME for determining a timer value on the basis of a target number of receptions of mobile terminated data in a wireless communication system according to various embodiments of the disclosure.

FIG. 7 illustrates operation flow of an MME for determining a timer value on the basis of a target number of receptions of mobile terminated data in a wireless communication system according to various embodiments of the disclosure. FIG. 7 illustrates operation 610 of FIG. 6 in more detail.

Referring to FIG. 7, in step 710, the MME 130 identifies whether an NAS message is received from the terminal 110. The NAS message may be a TAU request message, an RAU request message, or an attach request message. The MME 130 may repeat the operation until reception of the NAS message is identified. When the NAS message is received, the MME 130 identifies an average number of transmissions of mobile terminated data transmitted to the terminal 110 while the terminal 110 is in the PSM state in operation 720.

The MME 130 determines the timer value on the basis of the identified average number of transmissions of mobile terminated data and the target number of receptions of mobile terminated data preset in the MME 130 in step 730. The relationship between the average number of transmissions of mobile terminated data, the target number of receptions of mobile terminated data, and the timer value which the MME 130 desires to determine is determined on the basis of a cumulative distribution function of gamma distribution of the average number of transmissions of mobile terminated data and the target number of receptions of mobile terminated data.

Figure 8:
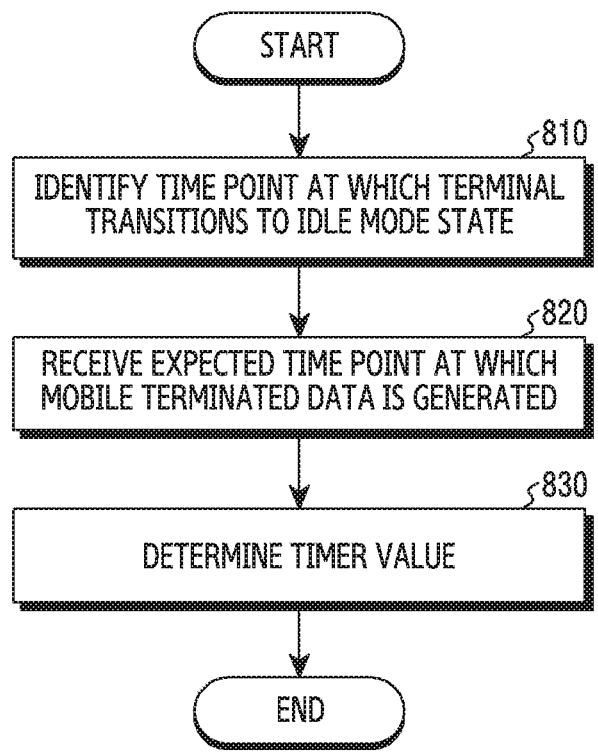
FIG. 8 illustrates operation flow of an MME for determining a timer value on the basis of an expected time point at which mobile terminated data is generated in a wireless communication system according to various embodiments of the disclosure.

FIG. 8 illustrates operation flow of an MME for determining a timer value on the basis of an expected time point at which mobile terminated data is generated in a wireless communication system according to various embodiments of the disclosure. FIG. 8 illustrates operation 610 of FIG. 6 in more detail.

Referring to FIG. 8, in step 810, the MME 130 identifies a time point at which the terminal 110 transitions from the connected-mode state to the idle mode state. More specifically, the MME 130 identifies the time point at which the terminal 110 transitions from the connected-mode state to the idle mode state on the basis a resource release request message received from the base station 120.

In step 820, the MME 130 receives information on the expected time point at which mobile terminated data is generated from the AS 170. The expected time point at which mobile terminated data is generated may be included in a communication pattern. For example, the expected time point at which the mobile terminated data is generated may be a scheduled communication time included in an architecture enhancements for services capability exposure (AESE) communication pattern set.

In step 830, the MME 130 determines the timer value on the basis of the time point at which the terminal transitions to the idle mode state and the expected time point at which the mobile terminated data is generated. More specifically, the MME 130 determines that a difference between the expected time point at which the mobile terminated data is generated and the time point at which the terminal transitions to the idle mode state is the timer value.

Figure 9:
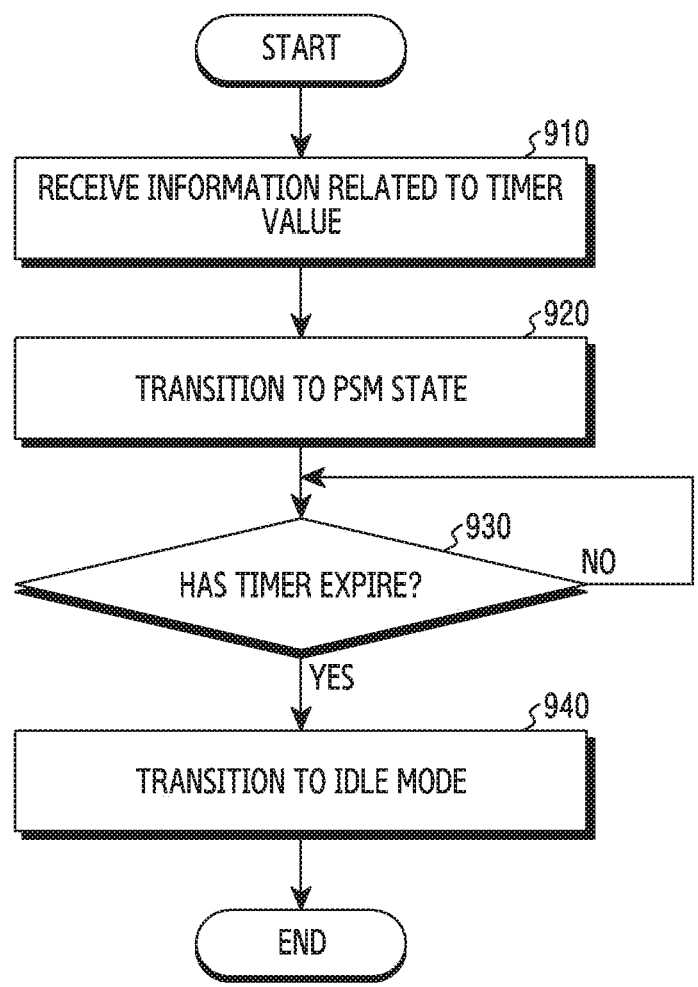
FIG. 9 illustrates operation flow of a terminal for transitioning a mode state on the basis of a timer value in a wireless communication system according to various embodiments of the disclosure.

FIG. 9 illustrates operation flow of a terminal for transitioning a mode state on the basis of a timer value in a wireless communication system according to various embodiments of the disclosure. The operation illustrated in FIG. 9 may be understood as the operation of the terminal 110.

Referring to FIG. 9, in step 910, the terminal 110 receives information on a timer (that is, the timer T3412) value used when the terminal 110 transitions from the PSM state to the idle mode state from the MME 130. The information on the timer value may be included in a TAU accept message, an RAU accept message, or an attach accept message. The timer value is determined by the MME 130 on the basis of one of an expected time point at which mobile terminated data is generated and a target number of receptions of mobile terminated data preset in the MME 130.

In step 920, the terminal 110 transitions from the idle mode state to the PSM state. Simultaneously with transitions of the terminal from the idle mode state to the PSM mode, the timer which the terminal 110 receives from the MME 130 starts. In step 930, the terminal 110 identifies whether the started timer expires. When the timer does not expire, the terminal 110 remains in the PSM state. When the timer expires, the terminal 110 transitions from the PSM state to the idle mode state.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only Memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a mobility management entity (MME) in a wireless communication system, the method comprising:
identifying a number of one or more transmissions of mobile terminated (MT) data for a terminal while the terminal is in a power saving mode (PSM);
determining a length of a timer based on the number of the one or more transmissions of the mobile terminated data, wherein the length of the timer is used to transit a state of the terminal from a PSM state to an idle mode state; and
transmitting information on the length of the timer to the terminal.

2. The method of claim 1,
wherein the length of the timer is determined based on the number of the one or more transmissions of mobile terminated data and a preset target number of receptions of mobile terminated data.

3. The method of claim 2, wherein a relationship between the number of the one or more transmissions of mobile terminated data, the target number of receptions of mobile terminated data, and the length of the timer is determined based on a cumulative distribution function of gamma distribution having the number of the one or more transmissions of mobile terminated data and the target number of receptions of mobile terminated data as parameters.

4. The method of claim 1, wherein the determining of the length of the timer comprises:
identifying a time point at which the terminal transitions to an idle mode state, based on a resource release request signal received from a base station (BS);
receiving information on the expected time point at which the mobile terminated data is generated from an application server (AS); and
determining the length of the timer, based on the time point at which the terminal transitions to the idle mode state and the expected time point at which the mobile terminated data is generated.

5. The method of claim 4, wherein the expected time point at which the mobile terminated data is generated comprises:
a scheduled communication time included in an architecture enhancement for services capability exposure (AESE) communication pattern set.

6. The method of claim 4, wherein the determining of the length of the timer comprises:
determining the length of the timer based on a difference between the expected time point at which the mobile terminated data is generated and the time point at which the terminal transitions to the idle mode state.

7. A mobility management entity (MME) in a wireless communication system, the MME comprising:
a transceiver; and
at least one processor functionally connected to the transceiver,
wherein the at least one processor is configured to:
identify a number of one or more transmissions of mobile terminated (MT) data for a terminal while the terminal is in a power saving mode (PSM);
determine a length of a timer based on the number of the one or more transmissions of the mobile terminated data, wherein the length of the timer is used to transit a state of the terminal from a PSM state to an idle mode state; and
control the transceiver to transmit information on the length of the timer to the terminal.

8. The MME of claim 7, wherein the length of the timer is determined based on the number of the one or more transmissions of mobile terminated data and a preset target number of receptions of mobile terminated data.

9. The MME of claim 8, wherein a relationship between the number of the one or more transmissions of mobile terminated data, the target number of receptions of mobile terminated data, and the length of the timer is determined based on a cumulative distribution function of gamma distribution having the number of the one or more transmissions of mobile terminated data and the target number of receptions of mobile terminated data as parameters.

10. The MME of claim 7, wherein the at least one processor is further configured to identify a time point at which the terminal transitions to an idle mode state, based on a resource release request signal received from a base station (BS), control the transceiver to receive information on the expected time point at which the mobile terminated data is generated from an application server (AS), and determine the length of the timer, based on the time point at which the terminal transitions to the idle mode state and the expected time point at which the mobile terminated data is generated.

11. The MME of claim 10, wherein the expected time point at which the mobile terminated data is generated comprises:
a scheduled communication time included in an architecture enhancements for services capability exposure (AESE) communication pattern set.

12. The MME of claim 10, wherein the at least one processor is further configured to:
determine the length of the timer based on a difference between the expected time point at which the mobile terminated data is generated and the time point at which the terminal transitions to the idle mode state.

13. A terminal in a wireless communication system, the terminal comprising:
a transceiver; and
at least one processor functionally connected to the transceiver,
wherein the at least one processor is configured to:
control the transceiver to receive information on a length of a timer from a mobility management entity (MME), and
transit from a power saving mode (PSM) state to an idle mode state, based on the length of the timer,
wherein the length of the timer is associated with a number of one or more transmissions of mobile terminated (MT) data for the terminal while the terminal is in the PSM state.

14. The terminal of claim 13, wherein the length of the timer value is determined by the MME, based on the number of the one or more transmissions of mobile terminated data for the terminal while the terminal is in the PSM state and a target number of receptions of mobile terminated data preset to the MME.

15. The terminal of claim 13, wherein the length of the timer is determined by the MME, based on a difference between an expected time point at which mobile terminated data which the MME receives from an application server (AS) is generated and a time point at which the terminal transitions to the idle mode state.

16. The terminal of claim 13, wherein the length of the timer is determined, by the MME, based on a difference between the expected time point at which the mobile terminated data received by the MME from an application server is generated and the time point at which the terminal transitions to the idle mode state.

* * * * *